(12) United States Patent
Svihel et al.

(10) Patent No.: US 10,948,155 B2
(45) Date of Patent: Mar. 16, 2021

(54) LIGHTING DEVICE WITH A MULTIPLE LIGHT FUNCTION

(71) Applicant: Varroc Lighting Systems, s.r.o., Senov u Noveho Jicina (CZ)

(72) Inventors: Jindrich Svihel, Suchdol and Odrou (CZ); Ivo Franc, Novy Jicin (CZ); Daniel Kopriva, Koprivnice (CZ)

(73) Assignee: VARROC LIGHTING SYSTEMS, S.R.O.

( * ) Notice: Subject to any disclaimer, the term of this patent is extended or adjusted under 35 U.S.C. 154(b) by 0 days.

(21) Appl. No.: 16/548,892

(22) Filed: Aug. 23, 2019

(65) Prior Publication Data

US 2020/0072436 A1    Mar. 5, 2020

(30) Foreign Application Priority Data

Sep. 5, 2018 (CZ) .................................... 2018-447

(51) Int. Cl.
*F21V 13/00* (2006.01)
*F21V 5/02* (2006.01)
(Continued)

(52) U.S. Cl.
CPC .................. *F21V 3/00* (2013.01); *B60Q 1/00* (2013.01); *F21S 43/241* (2018.01);
(Continued)

(58) Field of Classification Search
CPC .. F21V 3/00; F21V 5/02; G02B 5/003; B60Q 1/00; F21S 43/241; F21S 43/249
See application file for complete search history.

(56) References Cited

U.S. PATENT DOCUMENTS

| 5,668,913 A | 9/1997 | Tai et al. ..................... 385/146 |
| 7,070,311 B2 * | 7/2006 | Lee ..................... F21S 41/143 362/545 |

(Continued)

FOREIGN PATENT DOCUMENTS

| DE | 10 2011 113 627 A1 | 3/2013 |
| DE | 10 2014 211 963 A1 | 12/2015 |

(Continued)

OTHER PUBLICATIONS

Search Report dated Apr. 30, 2019 in corresponding Czech Republic Patent Application No. PV 2018-447.

*Primary Examiner* — Arman B Fallahkhair
(74) *Attorney, Agent, or Firm* — Ostrolenk Faber LLP

(57) ABSTRACT

A lighting device with a multiple light function includes an optical component (1) which includes a transparent segment (1a) having a primary transparent part (2) and a secondary transparent part (3) which parts are connected to each other by an interconnecting channel (4). A non-transparent segment (1b) is connected to the transparent segment (1a). A primary lighting unit (2a) illuminates the primary transparent part (2) and a secondary lighting unit (3a) illuminates the secondary transparent part (3). Leading-out optics are formed by prismatic elements (6) in the interconnecting channel (4) of the transparent segment (1a) of the optical component (1). Against the leading-out optics, a light absorber (8) is formed in the part of the non-transparent segment (1b) overlapping the interconnecting channel (4). The light absorber (8) being adapted to convert light energy into thermal energy.

6 Claims, 3 Drawing Sheets

(51) Int. Cl.
  *G02B 5/00* (2006.01)
  *F21V 3/00* (2015.01)
  *B60Q 1/00* (2006.01)
  *F21S 43/241* (2018.01)
  *F21S 43/249* (2018.01)
(52) U.S. Cl.
  CPC .............. *F21S 43/249* (2018.01); *F21V 5/02* (2013.01); *G02B 5/003* (2013.01)

(56) References Cited

U.S. PATENT DOCUMENTS

| | | | |
|---|---|---|---|
| 8,591,083 B2* | 11/2013 | Koizumi | B60Q 1/302 |
| | | | 362/522 |
| 2010/0132232 A1 | 6/2010 | Frisch | 40/208 |
| 2012/0182722 A1* | 7/2012 | Wu | F21S 43/26 |
| | | | 362/157 |
| 2012/0230046 A1 | 9/2012 | Rice et al. | 362/538 |
| 2015/0316226 A1* | 11/2015 | Kumar | B60Q 1/00 |
| | | | 362/522 |
| 2018/0017226 A1* | 1/2018 | Valois | F21S 43/20 |

FOREIGN PATENT DOCUMENTS

| | | |
|---|---|---|
| EP | 0 510 532 A2 | 10/1992 |
| FR | 3 014 787 A1 | 6/2015 |

* cited by examiner

LIGHTING DEVICE WITH A MULTIPLE LIGHT FUNCTION

CROSS-REFERENCE TO A RELATED APPLICATION

The present application claims priority to Czech Republic Patent Application No. PV 2018-447, filed Sep. 5, 2018, the content of which is incorporated by reference herein.

TECHNICAL FIELD

The invention relates to a lighting device with a multiple light function comprising an optical component which includes a transparent segment with a primary transparent part and a secondary transparent part, which are connected to each other by an interconnecting channel, and a non-transparent segment, whereby a primary lighting unit is assigned to the primary transparent part and a secondary lighting unit is assigned to the secondary transparent part.

BACKGROUND ART

In lighting technology, especially in land vehicles, there is a need to perform multiple light functions in one, i.e., common, area. Each of the light functions includes its own optical assembly, and some components are manufactured to be part of multiple light functions. The documents DE102011113627A1, EP510532A2, FR3014787A1, US20120182722A1, US20120230046A1 disclose numerous solutions that seek to ensure optimal light functions through a common optical component, such as cover glass, a light filter, a cover mask, etc. Such a common optical component is most often produced by a multiple injection molding method, whereby the individual parts of the optical component belong to different optical systems. Only a part of the light filter is luminously active when providing the required light function. In order to make the production process as simple as possible, as few inlets as possible are used in the multiple injection process. Therefore, if the filter consists of two parts that are identical in color, the manufacturing process is designed so that both parts are made through a single inlet, which means that both parts of the filter are connected by a connecting channel which is not part of the optical functions. The disadvantage of such light filters is the fact that, during operation, unwanted parasitic light is often transmitted through the connecting channel from one part of the filter to the other part of the filter.

The aim of the invention is to eliminate or at least minimize the drawbacks of the background art, in particular to allow the independence of the individual light surfaces of the optical component which is intended for multiple light functions, while maintaining the simplicity of the manufacturing process, especially the smallest possible number of inlets in the multiple injection process.

PRINCIPLE OF THE INVENTION

The aim of the invention is achieved by a lighting device according to the invention, whose principle consists in that optics for leading-out light is formed in the interconnecting channel by means of a plurality of prismatic elements Against the optics, a light absorber adapted to convert light energy into thermal energy is provided in a portion of the non-transparent segment overlapping the interconnecting channel. This prevents transillumination between the primary and secondary transparent parts, since the portion of the light which enters the interconnecting channel is gradually led out in the forward perpendicular direction by means of facets of the prismatic elements which meet the conditions of total reflection and is absorbed on the absorber.

Further features and advantages are defined in the dependent patent claims.

EXAMPLES OF EMBODIMENT

Figure 1:
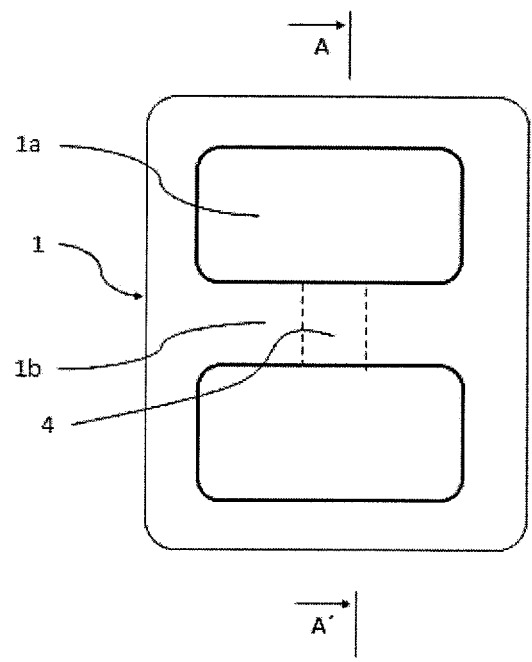
FIG. 1 shows a front view of the lighting device.

The lighting device shown in FIG. 1 comprises an optical component 1, which is manufactured as a one-piece cast by a multiple injection (molding) method, and comprises two materially different segments 1a, 1b.

Figure 2:
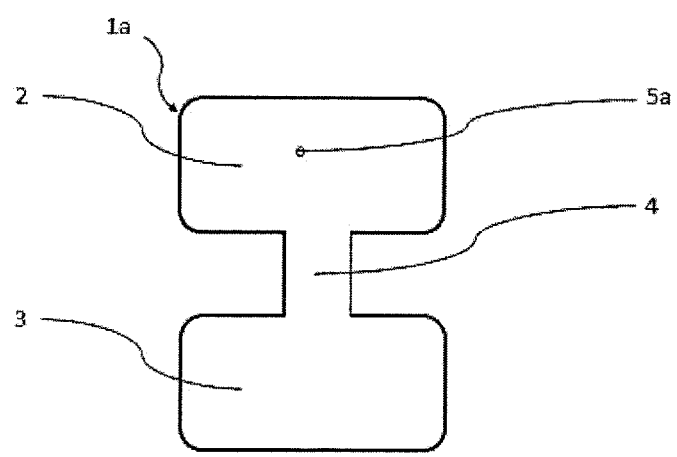
FIG. 2 is a front view of the transparent segment.
Figure 3:
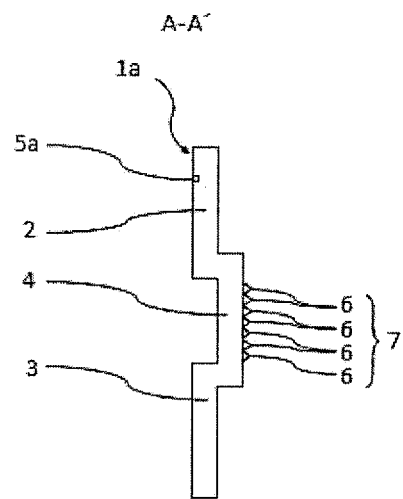
FIG. 3 is a side view of the transparent segment of FIG. 2.

FIG. 2 and FIG. 3 show a transparent segment 1a of the optical component 1 including a primary transparent part 2 and a secondary transparent part 3, which are interconnected by means of an interconnecting channel 4 which is also transparent. The entire transparent segment 1a is made by injection molding through the first inlet opening 5a. The interconnecting channel 4 is provided with leading-out optics 7 comprising a plurality of prismatic elements 6 on the rear side of the interconnecting channel 4. The prismatic elements 6 are adapted to prevent the passage of the light rays 10 reflected on the adjacent edges of the primary transparent part 2 or the secondary transparent part 3 from the front surface of one respective transparent part 2, 3 through the interconnecting channel 4 to the second transparent part 2, 3. The portion of the light which thus passes from the respective transparent part 2, 3 to the interconnecting channel 4, is gradually led out in the forward perpendicular direction by means of the above-mentioned facets of the prismatic elements 6 which meet the conditions of total reflection, and after being led out is absorbed on the absorber 8, which is shown in FIG. 4.

Figure 4:
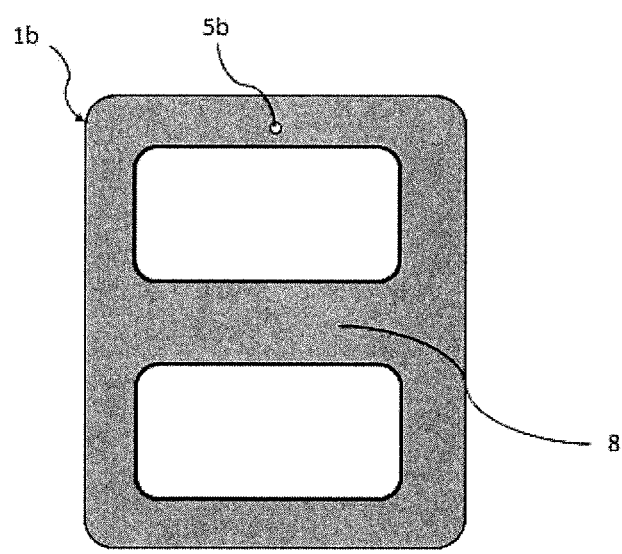
FIG. 4 is a front view of the non-transparent segment.

The non-transparent segment 1b of the optical component 1 shown in FIG. 4 is made through a second inlet opening 5b. In the assembled state of the lighting device, the interconnecting channel 4 of the transparent segment 1a from the front view extends behind the central part of the non-transparent segment 1b, as is indicated by a dashed line in FIG. 1, whereby at least on a part of the non-transparent segment 1b located opposite the interconnecting channel 4, a light absorber 8 is provided to convert light energy into thermal energy. The absorber 8 is, for example, a part of the inner structure of the non-transparent segment 1b and is manufactured by the same injection molding method as the other parts of the non-transparent segment 1b of the optical component 1, and there is no light absorption in the parts of the non-transparent segment 1b outside the absorber 8.

Figure 5:
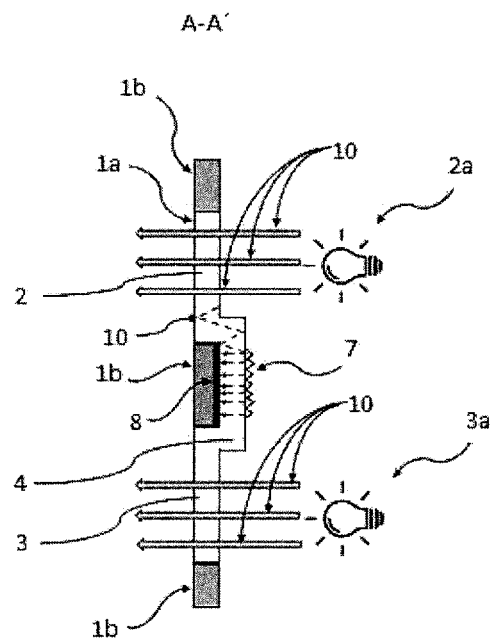
FIG. 5 is a cross-sectional view of the lighting device of FIG. 1 with the light absorber taken along line A-A' and
FIG. 6 is a cross-sectional view of the lighting device with the non-transparent segment made of a dark color material taken along line A-A'.

As shown in FIG. 5, a primary light unit 2a for emitting the light rays 10 of the first light function is located inside the lighting device against the primary transparent part 2.

Opposite the secondary transparent part 3, a secondary light unit 3a for emitting light beams 10 of the second light function is located inside the light device. A portion of the light rays 10 of the first and/or second light functions is led into the inner structure of the transparent segment 1a. The light rays 10 which penetrate into the interconnecting channel 4 are reflected by means of the leading-out optics 7 and by means of the leading-out surfaces of the prismatic elements 6 thereof to the absorber 8 in which they are absorbed.

Figure 6:
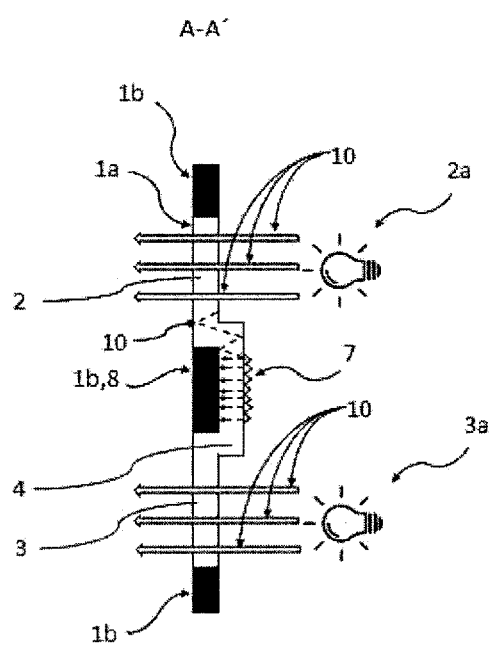

In the embodiment shown in FIG. 6, the entire non-transparent segment 1b is made of a dark color material capable of converting light energy into thermal energy and the part of the non-transparent segment 1b overlapping the interconnecting channel 4 is used as the absorber 8.

The invention claimed is:

1. A lighting device with a multiple light function, comprising an optical component which comprises a transparent segment having a primary transparent part with a first rear side and having a secondary transparent part with a second rear side; an interconnecting channel connecting both the primary and the secondary transparent parts to each other, the channel having a rear side; a primary lighting unit is assigned to illuminating the first rear side of the primary transparent part and a secondary lighting unit is assigned to illuminating the second rear side of the secondary transparent part, prismatic leading-out optics is provided on the rear side of the interconnecting channel; a front side of the interconnecting channel is situated facing at least the prismatic leading-out optics and is overlapped with a non-transparent segment; a light absorber in at least part of the non-transparent segment overlapping the interconnecting channel, the light absorber being adapted to convert light energy applied on the absorber into thermal energy.

2. The lighting device according to claim 1, wherein the light absorber comprises a dark color part of the non-transparent segment.

3. The lighting device according to claim 2, wherein the non-transparent segment comprises a dark color material which is adapted to convert light energy on the absorber into thermal energy.

4. The lighting device according to claim 1, wherein the light absorber on a rear/inner side of the non-transparent segment.

5. The lighting device according to claim 1, wherein the optical component comprises by a one-piece cast comprised of two materially different segments manufactured by a multiple injection molding method.

6. The lighting device according to claim 1, wherein the prismatic leading-out optics comprises prismatic elements on the interconnecting channel.

* * * * *